(12) United States Patent
Strobel et al.

(10) Patent No.: US 12,414,583 B2
(45) Date of Patent: Sep. 16, 2025

(54) DELIVERY TRAY FOR POD PRINTING WITH FOOD PRODUCT PRINTER

(71) Applicant: Primera Technology, Inc., Plymouth, MN (US)

(72) Inventors: Mark D. Strobel, Orono, MN (US); Erick Hagstrom, Wayzata, MN (US)

(73) Assignee: Primera Technology, Inc., Plymouth, MN (US)

( * ) Notice: Subject to any disclaimer, the term of this patent is extended or adjusted under 35 U.S.C. 154(b) by 43 days.

(21) Appl. No.: 18/484,228

(22) Filed: Oct. 10, 2023

(65) Prior Publication Data

US 2024/0032582 A1 Feb. 1, 2024

Related U.S. Application Data

(63) Continuation-in-part of application No. 16/985,836, filed on Aug. 5, 2020.

(60) Provisional application No. 62/894,323, filed on Aug. 30, 2019.

(51) Int. Cl.
*B41J 3/407* (2006.01)
*A23P 20/25* (2016.01)

(52) U.S. Cl.
CPC ........... *A23P 20/25* (2016.08); *B41J 3/40731* (2020.08); *A23P 2020/253* (2016.08)

(58) Field of Classification Search
CPC .................................................. B41J 3/40731
See application file for complete search history.

(56) References Cited

U.S. PATENT DOCUMENTS

| 2,819,671 A | * | 1/1958 | Porter, Jr. ............... B41F 17/16 |
| | | | 101/DIG. 30 |
| 4,339,993 A | | 7/1982 | Lee |
| 4,632,028 A | | 12/1986 | Ackley |
| 4,910,661 A | | 3/1990 | Barth et al. |

(Continued)

FOREIGN PATENT DOCUMENTS

| CN | 1868754 A | 11/2006 |
| CN | 201325212 Y | 10/2009 |

(Continued)

OTHER PUBLICATIONS

International Search Report issued for PCT/US2020/048406, dated Nov. 26, 2020.

(Continued)

*Primary Examiner* — Andrew D Graham
(74) *Attorney, Agent, or Firm* — Westman, Champlin & Koehler, P.A.; Z. Peter Sawicki; Amanda M. Prose (57) ABSTRACT

An adapter assembly for a food product printer having a plurality of beverage capsule holders and aa adapter for coupling to a print positioning arm of the food product printer. Each beverage capsule holder has an interior cavity configured to receive a beverage capsule therein, an open top for exposing a print surface of the beverage capsule received therein and a perimeter support surface positioned on an exterior surface thereof and extending outwardly therefrom, the perimeter support surface spaced apart vertically from a base of the beverage capsule holder. The adapter is configured to receive and hold the base of the beverage capsule holder such that the beverage capsule holder is retained in an upright position and at the adapter.

9 Claims, 10 Drawing Sheets

(56) References Cited

U.S. PATENT DOCUMENTS

| | | | |
|---|---|---|---|
| 4,981,074 A * | 1/1991 | Machita | H05K 3/1216 |
| | | | 101/35 |
| 5,505,775 A | 4/1996 | Kitos | |
| 5,795,395 A | 8/1998 | Ben-Matitayhu et al. | |
| 5,988,787 A | 11/1999 | Watanabe et al. | |
| 6,230,073 B1 | 5/2001 | Kofman et al. | |
| 6,245,386 B1 | 6/2001 | Felker et al. | |
| 6,280,785 B1 | 8/2001 | Yang et al. | |
| 6,538,767 B1 * | 3/2003 | Over | B41J 3/4073 |
| | | | 358/1.18 |
| 6,923,115 B1 * | 8/2005 | Litscher | B41J 3/40731 |
| | | | 101/DIG. 40 |
| 7,114,445 B2 | 10/2006 | Ackley et al. | |
| 7,625,198 B2 | 12/2009 | Lipson et al. | |
| 9,108,794 B2 * | 8/2015 | Fu | B01D 39/16 |
| 9,120,300 B2 | 9/2015 | Moehringer et al. | |
| 9,710,901 B2 | 7/2017 | Seo et al. | |
| 10,231,477 B1 | 3/2019 | Salvatori et al. | |
| 2001/0005522 A1 | 6/2001 | Stewart | |
| 2001/0046535 A1 | 11/2001 | Bowling | |
| 2002/0097280 A1 * | 7/2002 | Loper | B41J 3/40731 |
| | | | 347/2 |
| 2003/0161913 A1 | 8/2003 | Stewart | |
| 2004/0031410 A1 | 2/2004 | Harris et al. | |
| 2004/0114192 A1 | 6/2004 | Jensen | |
| 2005/0087083 A1 * | 4/2005 | Dumenil | B41F 15/0863 |
| | | | 101/115 |
| 2005/0088693 A1 | 4/2005 | Schnoebelen et al. | |
| 2005/0157148 A1 * | 7/2005 | Baker | A23G 9/322 |
| | | | 347/106 |
| 2006/0119628 A1 | 6/2006 | Kofman et al. | |
| 2006/0160250 A1 | 7/2006 | Bonassar et al. | |
| 2007/0231435 A1 | 10/2007 | Ream et al. | |
| 2008/0152756 A1 | 6/2008 | Ream et al. | |
| 2008/0254172 A1 | 10/2008 | Woodhouse et al. | |
| 2009/0021548 A1 * | 1/2009 | Suzuki | B41J 2/17566 |
| | | | 347/14 |
| 2009/0074928 A1 | 3/2009 | Pikalo | |
| 2009/0250316 A1 | 10/2009 | Gaetano et al. | |
| 2009/0256897 A1 * | 10/2009 | Polk | B41J 3/40731 |
| | | | 101/44 |
| 2010/0013880 A1 * | 1/2010 | Polk | B41J 3/4073 |
| | | | 347/55 |
| 2010/0091054 A1 * | 4/2010 | Vesanto | B41J 3/4073 |
| | | | 347/104 |
| 2011/0020508 A1 * | 1/2011 | Santoiemmo | A23L 2/56 |
| | | | 426/232 |
| 2011/0025735 A1 | 2/2011 | Nohilly et al. | |
| 2011/0236552 A1 | 9/2011 | Vink | |
| 2012/0036046 A1 | 2/2012 | Anderson et al. | |
| 2012/0141636 A1 | 6/2012 | Ackley, Jr. et al. | |
| 2012/0306987 A1 * | 12/2012 | Kim | B41J 3/4073 |
| | | | 347/224 |
| 2012/0328747 A1 | 12/2012 | Levy | |
| 2013/0089642 A1 | 4/2013 | Lipson et al. | |
| 2014/0234500 A1 | 8/2014 | Mitchell et al. | |
| 2015/0004320 A1 * | 1/2015 | Perret | B41J 3/40733 |
| | | | 427/256 |
| 2015/0010722 A1 * | 1/2015 | Yamada | B41J 2/01 |
| | | | 524/46 |
| 2015/0166257 A1 * | 6/2015 | Trombetta | B65D 85/8043 |
| | | | 426/115 |
| 2015/0202888 A1 * | 7/2015 | Miyashita | B41J 3/40731 |
| | | | 347/110 |
| 2015/0202902 A1 * | 7/2015 | Onodera | B41J 3/4073 |
| | | | 347/37 |
| 2015/0210086 A1 * | 7/2015 | Onodera | B41J 2/01 |
| | | | 347/104 |
| 2015/0273864 A1 * | 10/2015 | Moehringer | B41J 3/4073 |
| | | | 347/16 |
| 2015/0283825 A1 * | 10/2015 | Takai | G06F 3/1256 |
| | | | 347/9 |
| 2016/0023471 A1 * | 1/2016 | Jeter | B41J 2/2103 |
| | | | 347/43 |
| 2016/0244250 A1 * | 8/2016 | Dolan, Jr. | B65D 85/8058 |
| 2016/0263920 A1 * | 9/2016 | Moehringer | B41J 3/4073 |
| 2017/0334595 A1 * | 11/2017 | Saccardi | B41J 3/4075 |
| 2018/0022124 A1 * | 1/2018 | Onodera | B41J 29/46 |
| | | | 347/8 |
| 2018/0022126 A1 * | 1/2018 | Miyashita | B41J 29/02 |
| | | | 347/104 |
| 2018/0338519 A1 | 11/2018 | Albert et al. | |
| 2019/0375213 A1 * | 12/2019 | Theopold | B65B 35/16 |
| 2021/0060989 A1 | 3/2021 | Hagstrom | |
| 2021/0125014 A1 * | 4/2021 | Lopez-Belmonte Encina | |
| | | | B42D 25/387 |

FOREIGN PATENT DOCUMENTS

| | | |
|---|---|---|
| CN | 105346266 A | 2/2016 |
| CN | 207128411 U | 3/2018 |
| EP | 0183611 A2 | 6/1986 |
| EP | 2738119 A1 | 6/2014 |
| EP | 3332978 A1 | 6/2018 |
| JP | 5346728 A | 12/1993 |
| JP | 6293431 A | 10/1994 |
| JP | 2005327918 A | 11/2005 |
| JP | 2007136729 A | 6/2007 |
| JP | 2008149538 A | 7/2008 |
| JP | 2009533241 A | 9/2009 |
| JP | 2012201058 A | 10/2012 |
| JP | 2013078894 A | 5/2013 |
| JP | 2013123835 A | 6/2013 |
| JP | 2015-202882 A | 11/2015 |
| JP | 2016-57662 A | 4/2016 |
| JP | 2017121703 A | 7/2017 |
| KR | 20040027323 A | 4/2004 |
| RU | 2224955 C2 | 2/2004 |
| WO | 1997/027759 A1 | 8/1997 |
| WO | 1999013707 A1 | 3/1999 |
| WO | 2001/029748 A1 | 4/2001 |
| WO | 2004018217 A1 | 3/2004 |

OTHER PUBLICATIONS

Written Opinion of the International Searching Authority issued for PCT/US2020/048406, dated Nov. 26, 2020.
International Search Report issued for PCT/US2020/048404, dated Nov. 19, 2020.
Written Opinion of the International Searching Authority issued for PCT/US2020/048404, dated Nov. 19, 2020.
International Search Report issued for PCT/US2020/048407, dated Nov. 19, 2020.
Written Opinion of the International Searching Authority issued for PCT/US2020/048407, dated Nov. 19, 2020.
Search Report issued for related EP patent application serial No. 20856725.5, dated Oct. 4, 2022.
Office Action issued for related JP patent application Serial No. 2022-513619, dated Apr. 10, 2024, with English translation.
Office Action issued for related JP patent application Serial No. 2022-513621, dated Sep. 20, 2024, with English translation.
Office Action issued for related JP patent application Serial No. 2022-513633, dated Sep. 19, 2024, with English translation.
Office Action issued for related JP patent application Serial No. 2023-137015, dated Oct. 3, 2024, with English translation.

* cited by examiner

DELIVERY TRAY FOR POD PRINTING WITH FOOD PRODUCT PRINTER

CROSS-REFERENCE TO RELATED APPLICATION

The present application is a continuation-in-part of U.S. application Ser. No. 16/985,836, filed on Aug. 5, 2020, which claims priority to and the benefit of U.S. provisional application Ser. No. 62/894,323, filed on Aug. 30, 2019, the contents of which are hereby incorporated in their entirety.

BACKGROUND

Printing with edible ink on food products is done for purposes of identifying, marking, decorating, or personalizing the food product. For example, food products such as cookies can be passed under a print head ejecting edible ink on the top surface of the cookie, whether iced or plain, and printed with a selected design. Additional items that can be personalized, identified, marked or decorated include beverage pods or containers.

Systems of the prior art that are able to print images on an array of food products supported on a conveyor belt or a tray where the printing of multiple products is time consuming, expensive and/or requires a larger and more expensive printer on the scale of a commercial printer. Even so, printing on individual items may be limited. Such systems also usually require sophisticated sensing systems to locate the position of each food item for printing.

In the prior art systems, the loading and unloading of a food product on a tray or conveyor during printing is generally impractical. The conveyor or tray are often not accessible while products are being printed. It is also difficult to accurately load a food product on a moving conveyor or tray. It is also difficult to load a food product on a moving conveyor or tray without adversely affecting the print quality of the image currently being printed.

SUMMARY

An aspect of the present disclosure relates to an adapter assembly for a food product printer. The adapter assembly includes a plurality of beverage capsule holders and an adapter for coupling to a print positioning arm of the food product printer. Each beverage capsule holder has an interior cavity configured to receive a beverage capsule therein, an open top for exposing a print surface of the beverage capsule received therein and a perimeter support surface positioned on an exterior surface thereof and extending outwardly therefrom, the perimeter support surface being spaced apart vertically from a base of the beverage capsule holder. The adapter is then configured to receive and hold the base of the beverage capsule holder such that the beverage capsule holder is retained in an upright position and at the adapter.

The beverage capsule holders are each configured with a first surface allowing the beverage capsule holder to be supported by the adapter and a second surface allowing the beverage capsule holder to be supported by a delivery tray such that the first and second surfaces are separate surfaces configured for automatic transfer of the beverage capsule holders between the adapter and the delivery tray.

The print surface of the beverage capsule is a cover seal of the beverage capsule.

The adapter for coupling to the printer has one or more prongs for removably coupling to one or more apertures in the print surface positioning arm and wherein the print surface positioning arm is extendable and retractable with respect to a print head of the food product printer. The adapter comprises an aperture and perimeter ring therearound for receiving and retaining the beverage capsule holder in a received position on the print surface positioning arm.

Another aspect of the present disclosure relates to a system for printing on a surface of a plurality of beverage capsules. The system includes a printer having a receiving arm supported by the printer and extendable and retractable across a path of a print head of the printer and positioned to extend from the printer and retract into the printer to receive one of the plurality of beverage capsules and deliver one of the plurality of beverage capsules to a position below the print head and to return the one of the plurality of beverage capsules after the beverage capsule has been printed on. The system includes a plurality of beverage capsule holders, each beverage capsule holder having a main body with a floor and open top and interior cavity configured to receive one of the plurality of beverage capsules therein and an adapter for removably coupling to the receiving arm, the adapter configured to receive one of the plurality of beverage capsule holders and retain said beverage capsule holder in an upright and stationary position thereon while the receiving arm extends, retracts, is positioned below the print head, or combinations thereof.

The system is also usable with a delivery tray spaced apart from the printer and having a plurality of beverage capsule holders spaced apart on the delivery tray and each holder configured for supporting one of the plurality of beverage capsule holders thereon, and wherein the delivery tray is configured for movement such that the delivery tray automatically and continuously delivers unprinted food product to the receiving arm and printer for printing on a surface thereof. Each of the plurality of beverage capsule holders have an exterior perimeter ring on the main body wherein the ring is configured to removably couple the beverage capsule holder to the delivery tray.

The adapter has one or more mechanism configured to frictionally engage with the receiving arm such that the adapter snaps into place on the receiving arm for converting the receiving arm for use with the beverage capsule holders.

The adapter has an aperture for receiving the main body of one of the beverage capsule holders and a lip provided around the aperture such that the beverage capsule holder is supported on the receiving arm and retained in an upright position on the receiving arm by the adapter.

Yet another aspect of the present disclosure relates to loading a plurality of beverage capsules into a corresponding plurality of beverage capsule holders; supporting each of the plurality of beverage capsules on a delivery tray by supporting a perimeter surface of each beverage capsule on a surface of the delivery tray in a manner wherein at least a portion of each beverage capsule extends below a plane of the delivery tray; extending a receiving arm of a printer towards the delivery tray and retrieving one beverage capsule holder from the delivery tray; and retracting the receiving arm into the printer with the beverage capsule holder supported thereon in order to print on a plurality of a plurality of beverage capsules. An exposed surface of the beverage capsule within the beverage capsule holder is printed on.

The method allows for printing on a plurality of beverage capsules by extending the receiving arm back towards the delivery tray and returning the beverage capsule holder to a same location on the delivery tray; advancing the delivery tray to a next position; retrieving a subsequent beverage capsule holder from the delivery tray; retracting the receiving arm into the printer with the subsequent beverage capsule holder thereon for printing on an exposed surface thereof.

The method also allows for adapting a food product printer for use with beverage capsules by removably coupling an adapter to the receiving arm wherein the adapter has a surface configured to receive and retain one beverage capsule therein or thereon for retrieving and retracting the beverage capsule holder.

DETAILED DESCRIPTION

A food product printing system of the present disclosure includes a printer system for printing an image on a surface of the food product. The food product may include beverage capsules. The print surface may be an actual surface of the food product itself or for example a surface of the beverage capsule itself. In one or more embodiments, a system or kit for automatically and continuously printing on a plurality of beverage capsules with a food product printer is described herein.

In one or more embodiments, the printer system comprises a printer having an extendable and retractable receiving arm and a delivery tray. The delivery tray may be rotatably supported on a base. Such a printer system is described in co-pending U.S. patent application Ser. No. 16/985,836, the disclosure being incorporated herein. The system may also be provided with a plurality of different delivery trays, each tray configured for continuous delivery of a varied number of beverage capsules, and/or for beverage capsules of different or specific dimensions.

In one or more embodiments, the receiving arm is configured for receiving a beverage capsule from the delivery tray and moving the beverage capsule from the delivery tray into the printer and into a printing position. The printing position is substantially below a print head of the printer such that the surface to be printed on is in the path of the print head. Once a surface of the beverage capsule is printed on, the receiving arm then returns the printed beverage capsule to the delivery tray. The delivery tray is also configured to move in one or more directions to continuously and automatically deliver a plurality of beverage capsules sequentially to the receiving arm. Thus, the system allows for the printing of a plurality of beverage capsules automatically and/or continuously without manual positioning or reloading of the printer.

What is meant by "beverage capsule" as used herein is a food or "beverage preparation" storage container or "pod". Such capsules provide components to produce a beverage when exposed to heated water. These capsules may also be known as a plastic cartridge containing for example, beverage preparations such as dry, ground and/or instant type coffee and a filter, dry tea leaves, instant cocoa or cocoa mixes, or other beverage preparations and configured for use in brewing machines such as a coffee brewing machines where water is provided to the contents of the capsule when brewing. The capsules are prepared and shipped as a dry item. That is, the material in the capsule when printed is substantially dry or otherwise lacking in substantial water content. The capsules referred to herein are known in the industry and sold under trademarks such as K-CUP®.

One embodiment of the printing system 10 usable with the beverage capsule printing assembly 100 described herein is a printing system of the type described in pending U.S. application Ser. No. 16/985,836 and is illustrated in FIGS. 1-6.

Referring to the beverage capsule printing assembly 100 as illustrated at FIGS. 7-10, the assembly 100 comprises a plurality of reusable beverage capsule holders 110 and a receiving arm adapter 120. The beverage capsule holders 110 are configured to receive a beverage capsule therein in an orientation wherein a print surface of the capsule is exposed at a top of the capsule holder 110. The beverage capsule holders 110 are each configured for removable coupling with the receiving arm adapter 120 and a delivery tray 22 as the beverage capsule holders 110 are transferred between a receiving arm 20 of the print system 10 and the delivery tray 22 during automatic and continuous printing of a plurality of beverage capsules 12.

The printing system 10 is configured to receive one beverage capsule 12 from the delivery tray 22, to print on a surface of the beverage capsule 12 and return the beverage capsule 12 to the delivery tray 14 after printing, where a subsequent capsule 12 may then be collected for printing. The system 10 is also configured to do so automatically and continuously for a pre-determined number of beverage capsules. The system 10 comprises a printer 14 having a print head 16 and nozzles (not shown) wherein the print head 16 and nozzles are configured for printing with edible ink or food grade ink. The printer 14 also supports the extendable and retractable receiving arm 20.

The receiving arm 20 is operably connected to a power source within the printer 14. The receiving arm 20 is extendable and retractable with respect to the position of the path of the print head 16. In one or more embodiments, the receiving arm 20 has a first end and a second opposing end and a substantially flat receiving surface extending therebetween. The first end is operably connected to a mechanism for retracting and extending the arm 20. The second end 21 and at least a portion of the receiving surface of the receiving arm 20 are configured for extending outwardly from the printer 14. The receiving arm adapter 120 may be configured to removable couple to the preexisting receiving arm 20 at the second end 21. In such embodiments, when extended, the receiving arm 20 may receive a beverage capsule 12, hold the beverage capsule 12 with, in or on the receiving arm adapter 120, and/or return a printed beverage capsule 12 to the delivery tray 22. The receiving arm 20 and adapter 120 also hold or support the beverage capsule 12 which may be within the beverage capsule holder 110 within the printer 14 and during printing on the surface of the beverage capsule 12.

The receiving arm adapter 120 is configured to couple to an end of the receiving arm 20. Alternatively, the receiving arm adapter 120 may directly and operably couple to the mechanism for retracting and extending the receiving arm 20 and thus may be use with or without the receiving arm 20. In such an embodiment, the adapter 120 is supported on its own dedicated receiving arm platform.

As shown in further detail in FIGS. 7-10, in one embodiment, the receiving arm adapter 120 has a surface area 122 configured to connect to the second end 21 of the receiving arm 20 and in the embodiment shown, the receiving arm adapter 120 may be coupled to the receiving arm 20 removably via one or more prongs 123 that mate or frictionally engage with one or more openings 124 in the receiving arm and/or a forward edge 125 of the receiving arm 20. In such an embodiment, the receiving arm adapter 120 is removable from the receiving arm 20.

The receiving arm adapter 120 further comprises a capsule holder mechanism 126 on the surface area 122 which may include an aperture therein configured to receive and hold a base 112 of one beverage capsule holder 110 on the receiving arm 20 there below. In the embodiment illustrated, the capsule holder mechanism 126 is an aperture with an upwardly extending and tapered perimeter lip 128. The perimeter lip 128 and aperture 126 provide a receiving mechanism 130 configured to receive the lower portion 112 of the beverage capsule holder 110 therein such that the beverage capsule holder 110 and beverage capsule 12 in the holder 110 are retained in a stationary and upright manner with respect to the receiving arm 20 as it retracts and extends with respect to the printer 10.

The adapter 120 may be comprised of a hard plastic material, or may otherwise be constructed of aluminum or a like metal. The adapter may further be coated with a food grade material such as silicon or the like.

Figure 7:
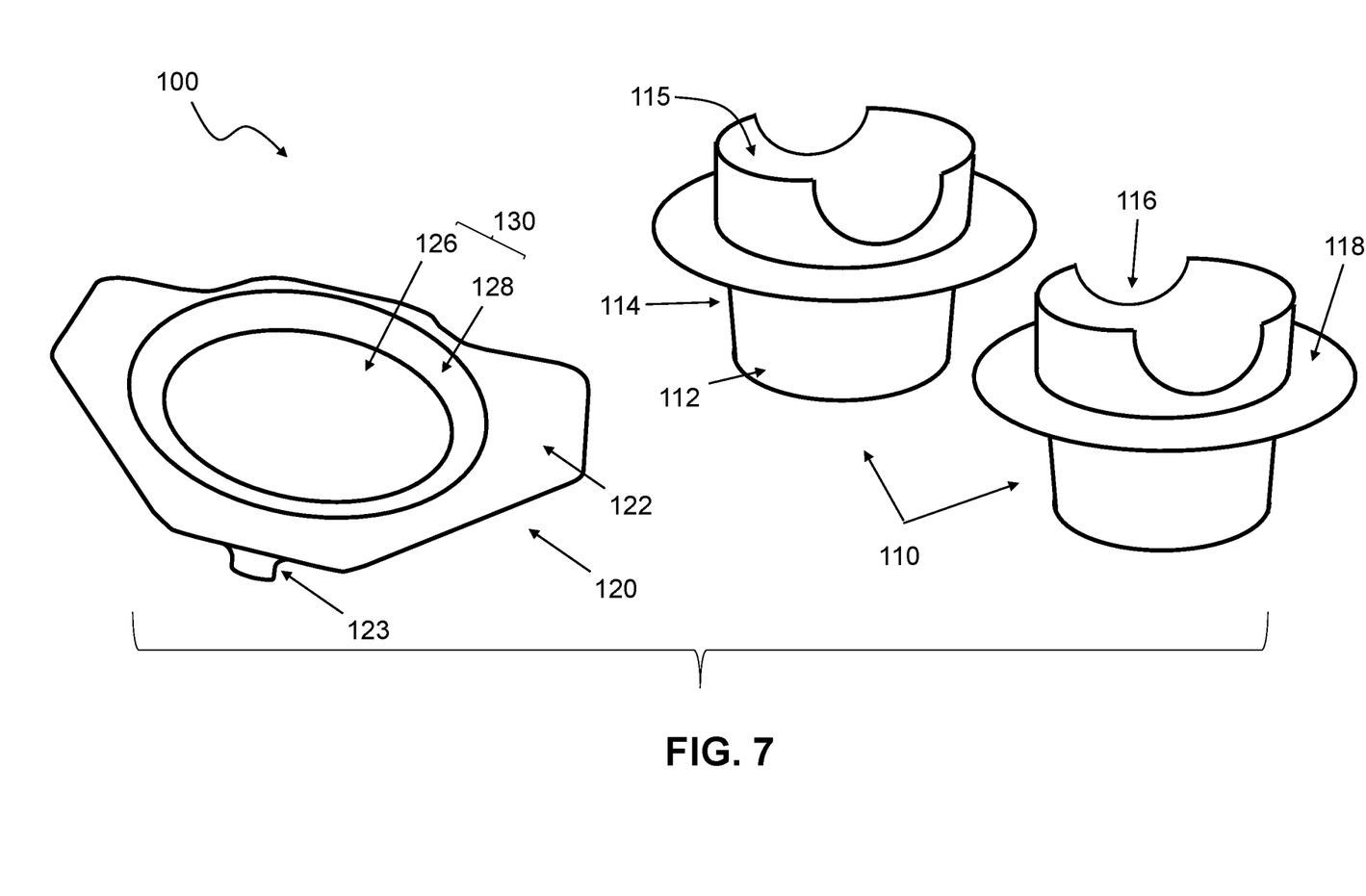
FIG. 7 illustrates an adapter system for the food product printer.
Figure 8:
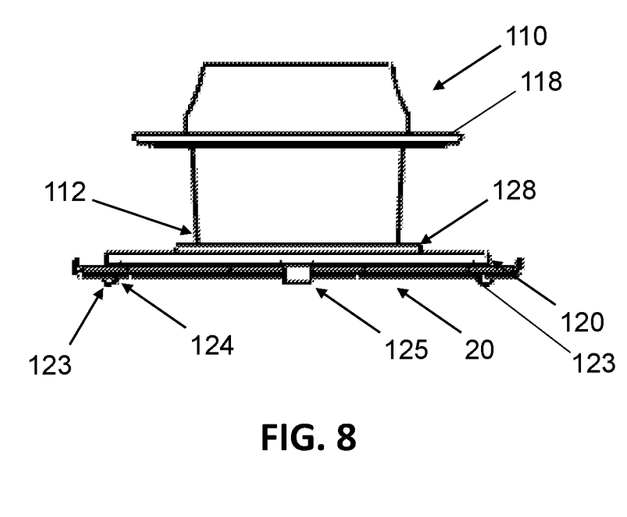
FIG. 8 is a front view of the adapter system on a receiving arm of the food product printer.
Figure 9:
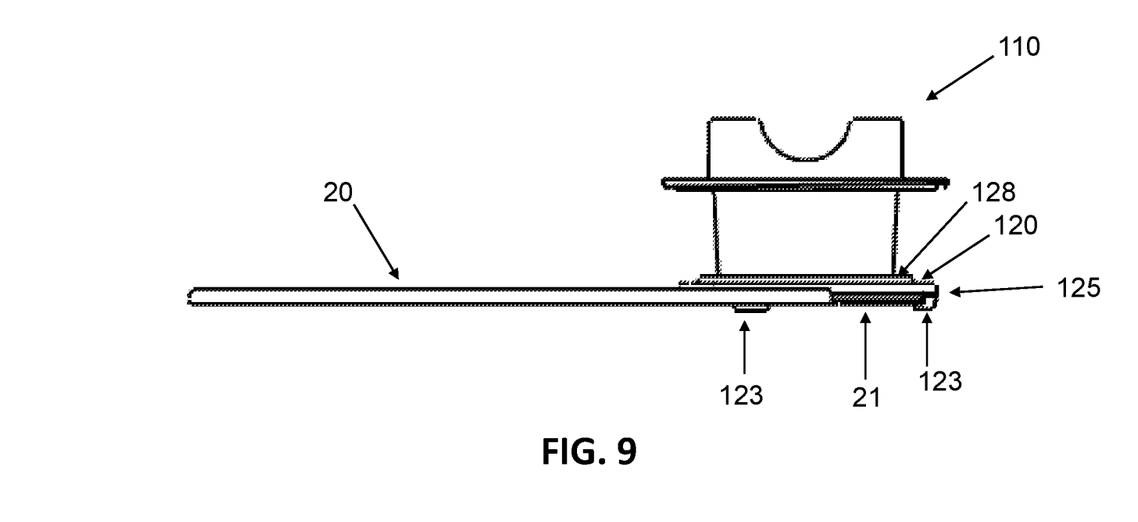
FIG. 9 is a side view of the adapter system on the receiving arm of the food product printer.
Figure 10:
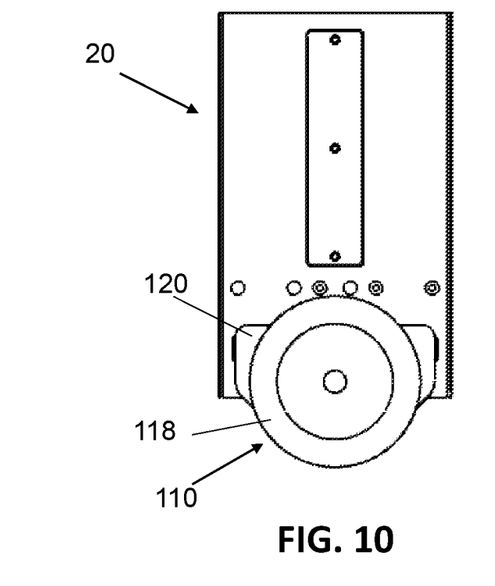
FIG. 10 is a top view of the adapter system on the receiving arm of the food product printer.

As shown in FIG. 7, the assembly 110 may be provided with a plurality of beverage capsule holders 110. Each beverage capsule holder 110 has a main body 114 comprising the base 112 and having an open top 115 for insertion of the beverage capsule 12 therein. The main body 114 is generally tubular and comprises one or more notches 116 or openings near the open top 115 which allow for easy insertion and removal of the beverage capsule 12 without damaging the integrity of the beverage capsule 12. The main body 114 further comprises one or more delivery tray coupling surfaces 118 extending therefrom. The delivery tray coupling surface 118 may be positioned at one or more locations along a height of the main body 114 and is configured to removably couple the capsule holder 10 to the delivery tray 22. In the embodiment illustrated, the delivery tray coupling surface 118 is a ring having a flat surface which rests on an upper surface of the delivery tray 22 when carried by the delivery tray 22. This allows for stable holding of the beverage capsule holder 110 on the delivery tray 22 and easy transfer of the beverage capsule holder 110 from tray 22 support to receiving arm 20 support. The coupling surface 118 is configured to engage with a pre-existing delivery tray of the printer system 10.

Referring back to FIGS. 4-5 the delivery tray 22 is configured with a plurality of holders 26 as described in further detail below. Each holder 26 is configured to receive and support a beverage capsule holder 110 and deliver the beverage capsule 12 and holder 110 to the receiving arm 20. The delivery tray illustrated includes twelve (12) holders 26, however, trays for holding fewer or more beverage capsules are contemplated and within the scope of this disclosure. The number of holders on a tray may be adjusted based on the type or size of item being printed.

Figure 1:
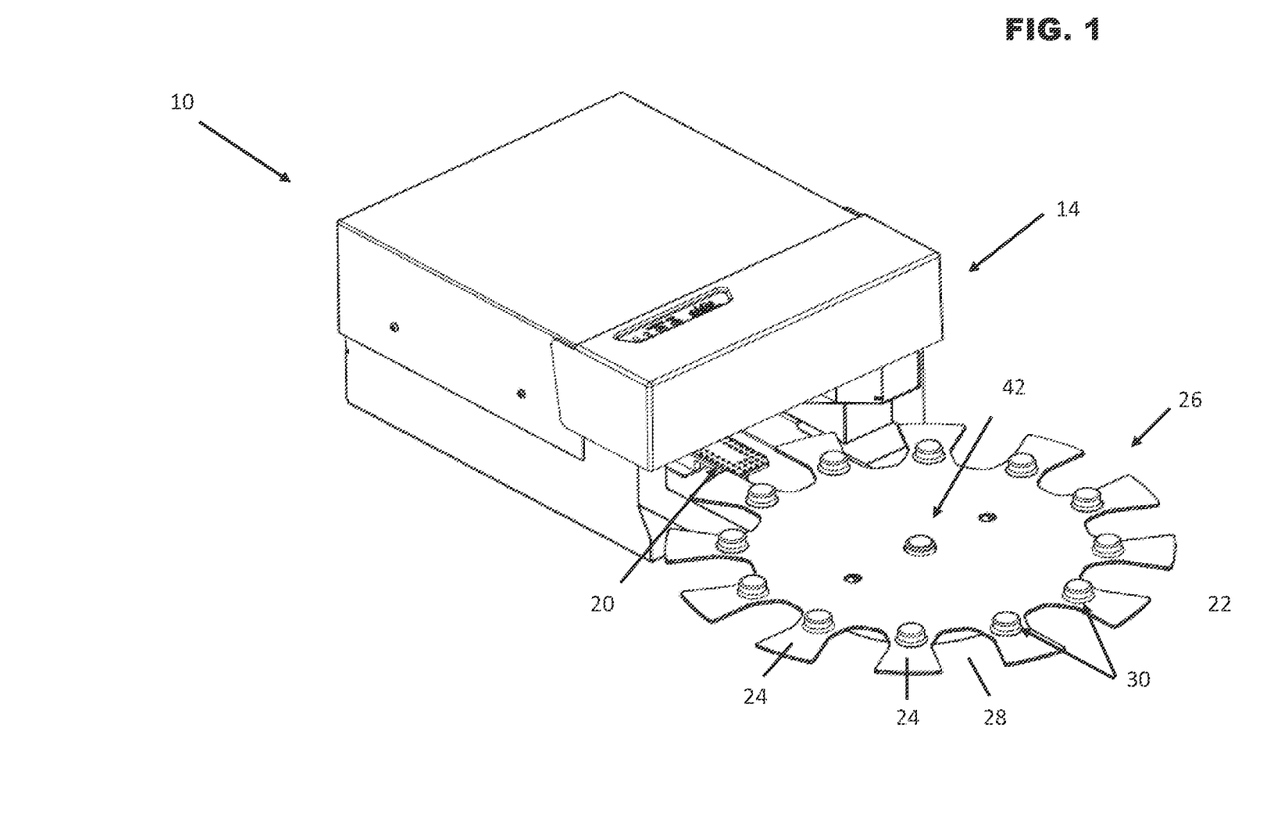
FIG. 1 is a perspective view of a food product printing system.
Figure 2:
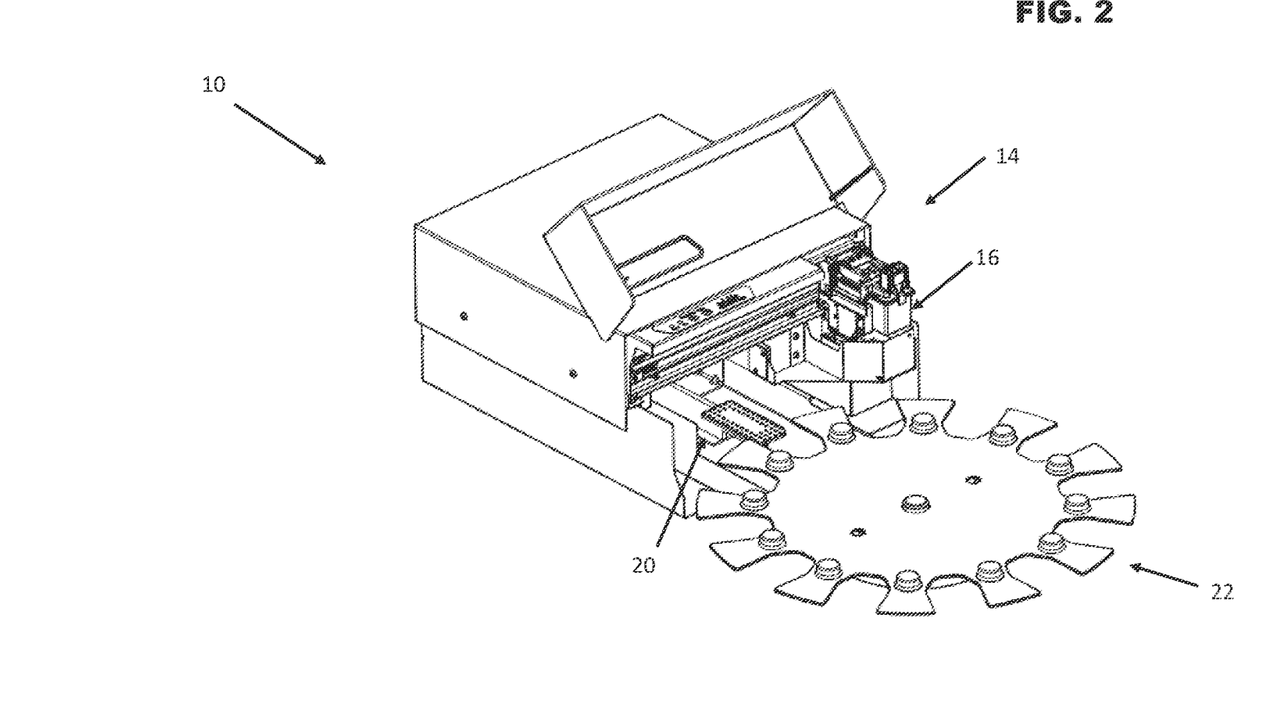
FIG. 2 is a perspective view of a food product printing system with a cover portion opened for exposing interior portions of a printer portion of the system.
Figure 3:
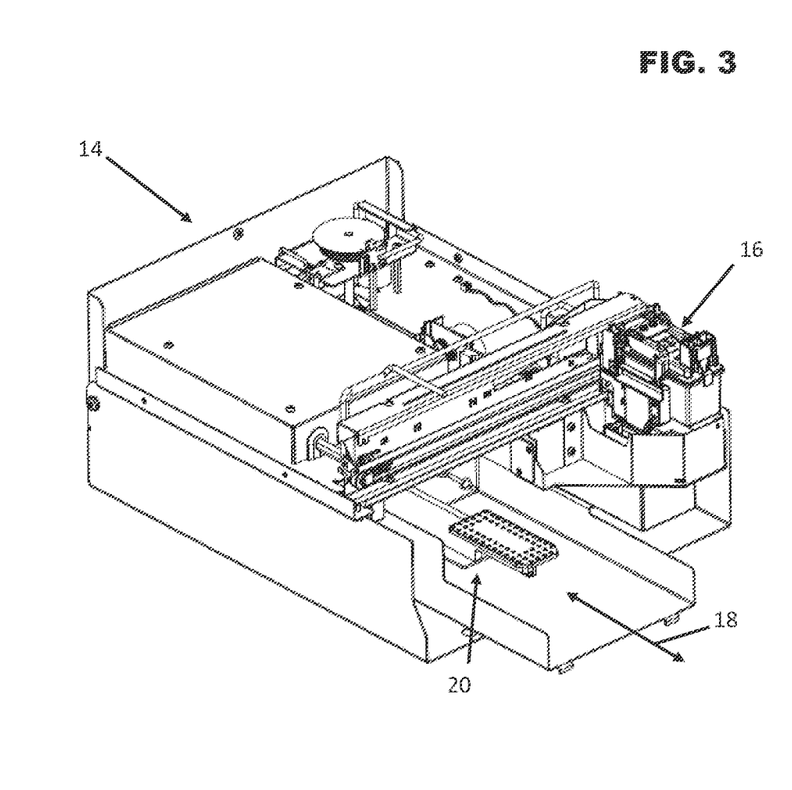
FIG. 3 is a top perspective view of the food product printing system having an automatic delivery tray component removed and a cover of a printer removed.
Figure 4:
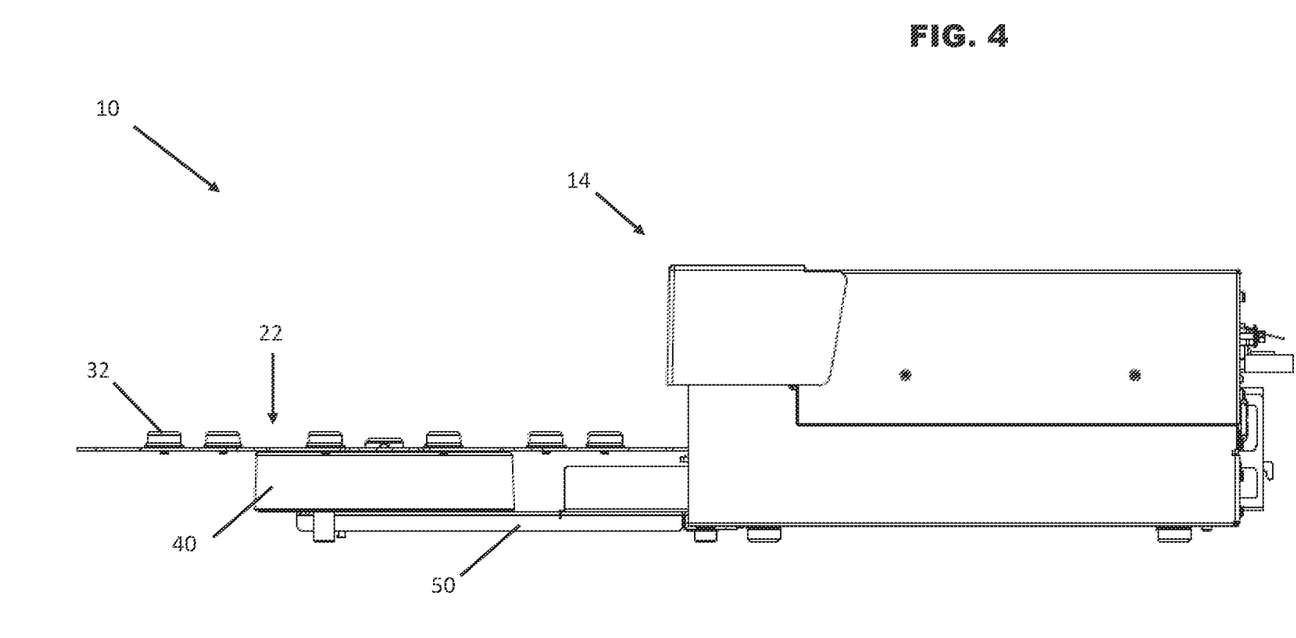
FIG. 4 is a side view of the food product printing system with the automatic delivery tray component removably secured to a tray base portion.
Figure 5:
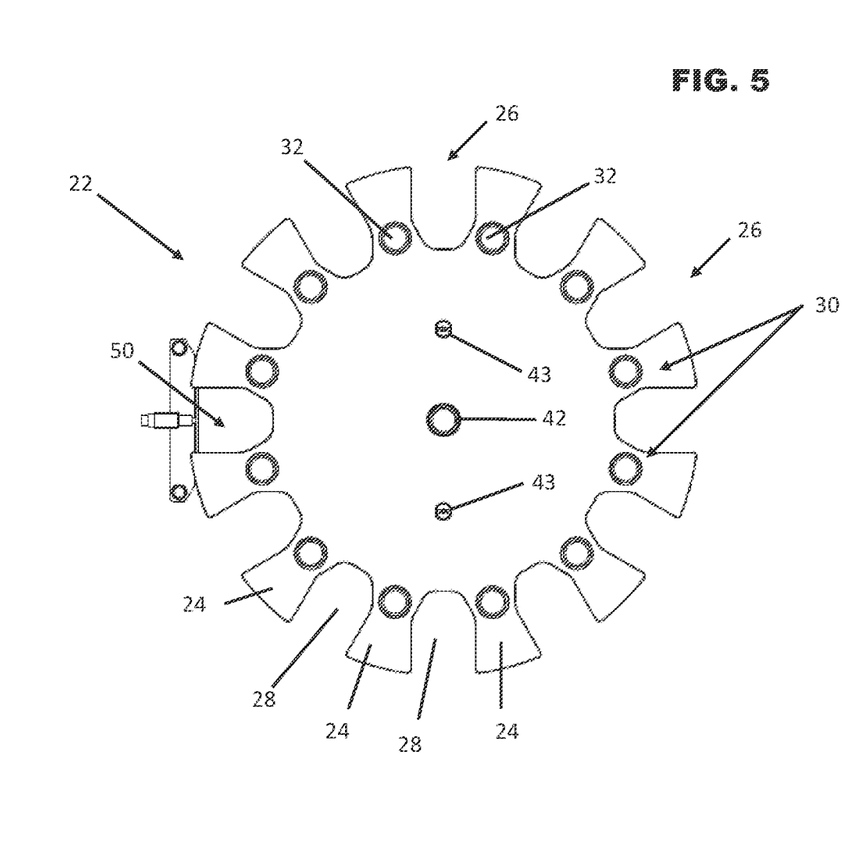
FIG. 5 is a top view of the tray secured on the base.
Figure 6:
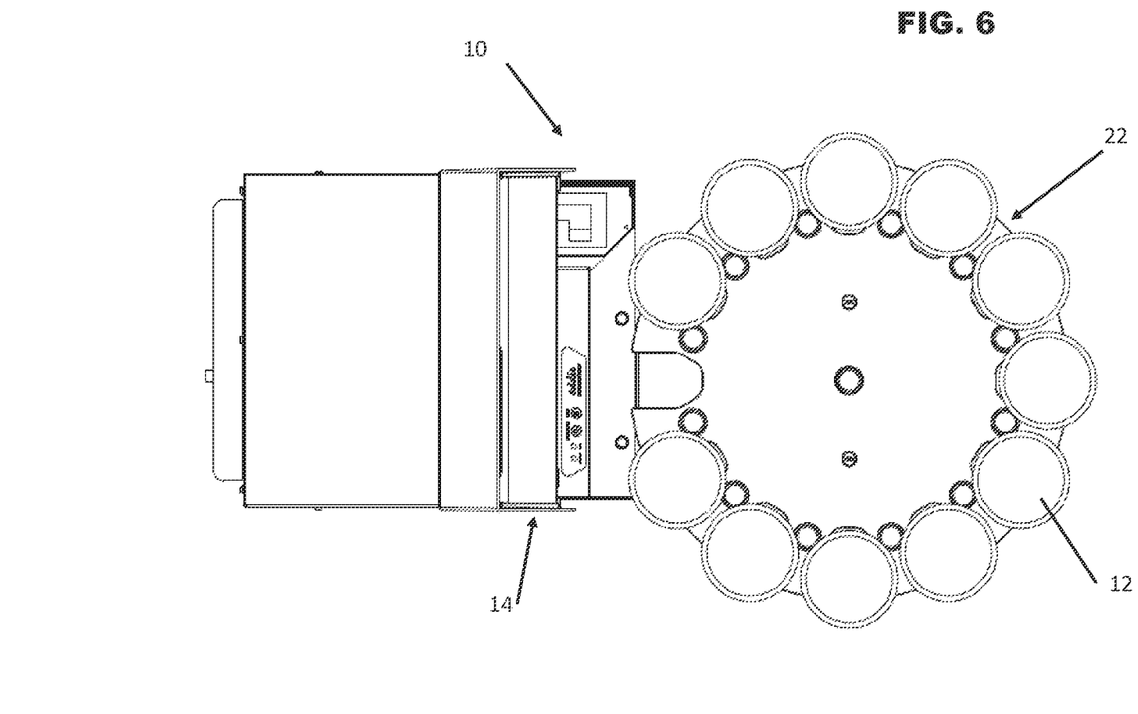
FIG. 6 is a top view of the food product printing system with food product for printing loaded thereon.
Figure 11:
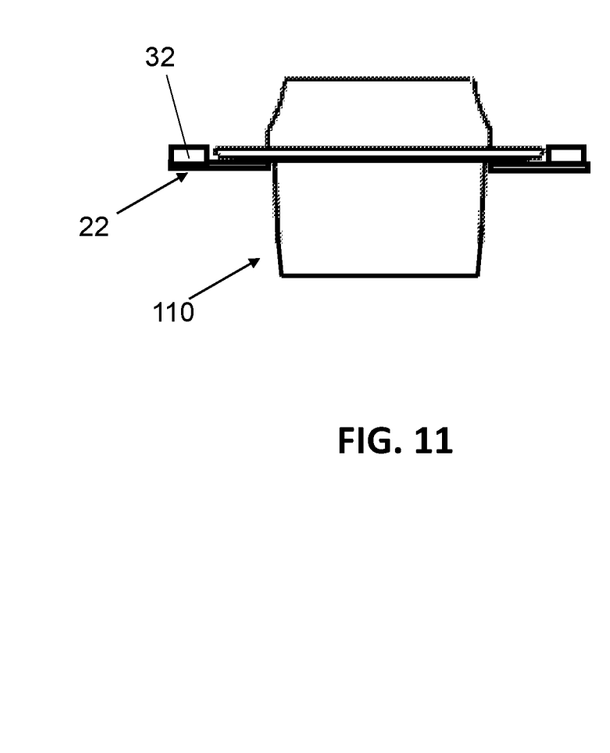
FIG. 11 is a front view of a beverage capsule holder supported on the delivery tray of the food printer.

In further detail, in one embodiment, each holder 26 has two support sides 24 extending from a center area of the tray 22 and an opening 28 between these support sides 24. The beverage capsule holder 110 is supported on the holder 26 by way of resting the coupling surface 118 on top of the two support sides 24 of the holder. The opening 28 between the sides 24 of the holder 26 is configured to allow receipt the receiving arm 20 for placing the base 112 on the receiving mechanism 130 of the receiving arm adapter 120.

In the embodiment illustrated, each holder 26 is configured to support or otherwise hold one or more sides, edges, or perimeter lengths of the beverage capsule holder 110 via contact of the support sides 24 with the coupling surface 118 of the main body 114 of the beverage capsule holder 110. The holders 26 may have one or more positioning mechanisms 30 for directing a position of the food product 12 when loaded onto the delivery tray 22. Positioning mechanisms 30 are provided, for example, on each of the support sides 24. These mechanisms 30 may take various shapes, including geometrical shapes such as a triangles for guiding and/or limiting the positioning of the beverage capsule holder 110 on the tray 22. Utilizing the positioning mechanisms 30 to set the position of the beverage capsule holder 110 during loading of the delivery tray 22 ensures delivery of the beverage capsule 12 to the receiving arm 20 such that the food product is balanced on and supported by the receiving arm adapter 120 and ensures the lid or seal surface of the beverage capsule 12 is centered for printing of the content on the capsule 12.

Loading of the delivery tray 22 with unprinted beverage capsules 12 can be done manually or in an automatic manner. As such, the system can be used with a conveyor or other automatic arm or other automated delivery system for delivering unprinted beverage capsules 12 to the delivery tray 22 and/or removing the printed product 12 from the delivery tray 22.

The delivery tray 22 advances about the openings 28 such that the delivery tray 22 advances from one opening 28 to the next adjacent opening 28 automatically after a beverage capsule 12 has been returned to the tray 22 by the receiving arm 20. For example, in the embodiment illustrated, the delivery tray 22 is a generally round tray that is rotatable about its center to advance the position of the holders 26 with respect to delivery of subsequent beverage capsules 12 to the receiving arm 20. The holders 26 are spaced apart around the perimeter of the delivery tray 22. The delivery tray 22 and base 40 may be a carousel for continuous delivery, loading and reloading of unprinted beverage capsules after printed beverage capsules have been returned to the delivery tray 22 and subsequently removed. While a rotatable tray is illustrated herein, the delivery tray 22 may also be linearly advanced, move in multiple directions, or move in the manner of a conveyor belt, by way of non-limiting examples. That is, once printed and returned to the delivery tray 22 as the delivery tray 22 advances to the next adjacent opening 28 for purposes of delivering one or more subsequent beverage capsules 12 to the printer 14, the printed and advanced beverage capsules may be removed and a new unprinted beverage capsules 12 placed on the tray 22. Thus, delivery of unprinted beverage capsules and receipt of said beverage capsules after printing can be essentially endless, limited only by supply or selection of a predetermined amount to be printed, for example.

As described previously, the holders 26 are generally spaced apart around the perimeter of the delivery tray 22 and the holders 26 have dimensions which allow the position of the beverage capsules 12 to be loaded onto the tray 22 in a known position. When the beverage capsules 12 is delivered to the receiving arm 20, the position of the beverage capsules 12 print surface with respect to the print head 16 is known when the receiving arm 20 is retracted. This allows for the elimination of sensors or other position or item detecting means and eliminates other delays due to location or position detection before printing. Instead, upon retraction of the receiving arm 20, printing can begin. This allows the automated process to proceed continuously and efficiently at an increased speed.

With respect to the printer 14, the print head 16 moves linearly back and forth along a gantry in the manner of a standard inkjet printer for ejecting (edible) ink towards the print surface and thus printing pre-selected content on a print surface positioned below the path of the print head 16. The printer 14 is in communication with a controller wherein software may be used to control printing of the content on one or a plurality of food products.

In further detail, the receiving arm adapter 120 moves in a direction perpendicular to the print head path such that the receiving arm adapter 120 extends and retracts across or through the path of the print head 16.

The receiving arm adapter 120 extends to receive or return the beverage capsule 12 and retracts from the tray 22 into the printer 14 and into a position below the print head 16 for printing. Once content is printed on a beverage capsule, the receiving arm adapter 120 then extends to return the beverage capsule 12 and capsule holder 110 back to the delivery tray 22. The delivery tray 22 then advances to provide a second unprinted beverage capsule 12 to the receiving arm adapter 120. The receiving arm adapter 120 is also configured for reciprocal vertical movement such that the receiving surface 130 of the receiving arm adapter 120 is movable between two positions, a raised and a lowered position, where these positions allow the receiving arm adapter 120 to retrieve and return food products 12 with respect to the delivery tray 22 in a manner wherein a surface of the beverage capsule holder 110 connects to, is caught by or otherwise supported by the delivery tray 22 when returning the printed beverage capsule 12 to the tray 22 and likewise is removed from connection with the delivery tray 22 for printing.

Once loaded, the receiving arm adapter 120 is then retracted to the printing position with the beverage capsule 12 thereon. This process continues on continuously and automatically until a pre-determined amount of beverage capsules 12 are printed.

Although the present disclosure has been described with reference to preferred embodiments, workers skilled in the art will recognize that changes may be made in form and detail without departing from the spirit and scope of the disclosure.

The invention claimed is:

1. An adapter assembly for a food product printer, the adapter assembly comprising:
    a plurality of beverage capsule holders, each beverage capsule holder having an interior cavity configured to receive a beverage capsule therein, an open top for exposing a print surface of the beverage capsule received therein and a perimeter support surface positioned on an exterior surface thereof and extending outwardly therefrom, the perimeter support surface spaced apart vertically from a base of the beverage capsule holder;
    an adapter for removably coupling to a print surface positioning arm of the food product printer comprising one or more prongs for removably coupling to one or more apertures in the print surface positioning arm and wherein the adapter is configured to removably receive and hold the base of one of the plurality of beverage capsule holders such that the beverage capsule holder is retained in an upright position and at the adapter, the adapter comprising one or more surfaces configured to removably couple to and support the perimeter support surface of the one or of the plurality of beverage capsule holders and the beverage capsule therein in an upright position for printing thereon.

2. The adapter assembly of claim 1 wherein the beverage capsule holders are each configured with a first surface allowing the beverage capsule holder to be supported by the adapter and a second surface allowing the beverage capsule holder to be supported by a delivery tray such that the first and second surfaces are separate surfaces configured for automatic transfer of the beverage capsule holders between the adapter and the delivery tray.

3. The adapter assembly of claim 1 wherein the print surface is a cover seal of the beverage capsule.

4. The adapter assembly of claim 1 wherein the print surface positioning arm is extendable and retractable with respect to a print head of the food product printer.

5. The adapter assembly of claim 4 wherein the adapter comprises an aperture and perimeter ring therearound for receiving and retaining the beverage capsule holder in a received position on the print surface positioning arm.

6. A system for printing on a surface of a plurality of beverage capsules, the system comprising:
    a printer; and
    a receiving arm supported by the printer and extendable and retractable across a path of a print head of the printer and positioned to extend from the printer and retract into the printer to receive one of the plurality of beverage capsules and deliver one of the plurality of beverage capsules to a position below the print head and to return the one of the plurality of beverage capsules after the beverage capsule has been printed on;
    a plurality of beverage capsule holders, each beverage capsule holder having a main body with a floor and open top, a perimeter support surface of the open top, and interior cavity configured to receive one of the plurality of beverage capsules therein;
    an adapter for removably coupling to the receiving arm, the adapter comprising one or more mechanism configured to frictionally engage with the receiving arm such that the adapter snaps into place on the receiving arm for converting the receiving arm for use with the beverage capsule holders, and the adapter configured to receive one of the plurality of beverage capsule holders and retain said beverage capsule holder in an upright and stationary position thereon while the receiving arm extends, retracts, is positioned below the print head, or combinations thereof, wherein the adapter comprises one or more surfaces configured to removably couple to and support the perimeter support surface of the one or of the plurality of beverage capsule holders and the beverage capsule therein in an upright position for printing thereon.

7. The system of claim 6 and further comprising:
a delivery tray spaced apart from the printer and having a plurality of beverage capsule holders spaced apart on the delivery tray and each holder configured for supporting one of the plurality of beverage capsule holders thereon, and wherein the delivery tray is configured for movement such that the delivery tray automatically and continuously delivers unprinted food product to the receiving arm and printer for printing on a surface thereof.

8. The system of claim 7 wherein each of the plurality of beverage capsule holders have an exterior perimeter ring on the main body wherein the ring is configured to removably couple the beverage capsule holder to the delivery tray.

9. The system of claim 6 wherein the adapter has an aperture for receiving the main body of one of the beverage capsule holders and a lip provided around the aperture such that the beverage capsule holder is supported on the receiving arm and retained in an upright position on the receiving arm by the adapter.

* * * * *